United States Patent
Tsang et al.

(10) Patent No.: US 11,048,045 B1
(45) Date of Patent: Jun. 29, 2021

(54) INTEGRATED LENS MODE SIZE CONVERTER

(71) Applicant: The Chinese University of Hong Kong, Hong Kong (CN)

(72) Inventors: Hon Ki Tsang, Hong Kong (CN); Zunyue Zhang, Liaoning (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 15/930,831

(22) Filed: May 13, 2020

(51) Int. Cl.
| G02B 6/26 | (2006.01) |
| G02B 27/09 | (2006.01) |
| G02B 6/14 | (2006.01) |
| G02B 3/00 | (2006.01) |
| G02B 6/124 | (2006.01) |
| G02B 6/12 | (2006.01) |
| G02B 6/30 | (2006.01) |
| G02B 6/122 | (2006.01) |

(52) U.S. Cl.
CPC ............... *G02B 6/262* (2013.01); *G02B 6/14* (2013.01); *G02B 27/0955* (2013.01); *G02B 6/124* (2013.01); *G02B 6/1228* (2013.01); *G02B 6/305* (2013.01); *G02B 2003/0093* (2013.01); *G02B 2006/12102* (2013.01); *G02B 2006/12152* (2013.01)

(58) Field of Classification Search
CPC ............ G02B 6/14; G02B 2006/12152; G02B 2006/12102
See application file for complete search history.

(56) References Cited

U.S. PATENT DOCUMENTS 10,126,500 B2 * 11/2018 Qi .................. G02B 6/3636
2009/0290837 A1 11/2009 Chen et al.

OTHER PUBLICATIONS

Baghdasaryan, et al., "Photonic Crystal Mikaelian Lenses and Their Potential Use as Transverse Focusing Elements in Microstructured Fibers," in IEEE Photonics Journal, vol. 5, No. 4, 7 pages (Aug. 2013) https://www.researchgate.net/figure/Four-types-of-photonic-crystal-Mikaelian-lens-considered-in-this-paper-The-hexagonal_fig2_255685704.
Cheng, et al., "Apodized focusing subwavelength grating couplers for suspended membrane waveguides," Appl. Phys. Lett. 101, 101104, 5 pages (2012).
Kotlyar, et al., "Photonic crystal lens for coupling two waveguides,"Applied Optics vol. 48, Issue 19, pp. 3722-3730 (2009).
Kotlyar, et al., "Subwavelength Focusing with a Mikaelian Planar Lens," Opt. Mem. Neural Networks, vol. 19, pp. 273-278 (2010).

(Continued)

*Primary Examiner* — Omar R Rojas
(74) *Attorney, Agent, or Firm* — Kilpatrick Townsend & Stockton LLP

(57) ABSTRACT

Low spherical aberration of a Mikaelian lens makes it suitable for focusing off-optical-axis light propagating in higher order modes. A Mikaelian lens can be used as a mode-size converter to expand light in a semiconductor waveguide before coupling light out of the waveguide. For example, a Mikaelian lens can be used in a waveguide to expand light from a 1 μm wide multimode waveguide to a 20 μm wide multimode grating coupler in a shorter distance than an adiabatic taper. 3D FDTD simulation results show that an embodiment of a 12 μm long, subwavelength mode-size converter has comparable first-order mode transmission as a 600 μm adiabatic taper.

20 Claims, 9 Drawing Sheets

(56) References Cited

OTHER PUBLICATIONS

Luque-Gonzalez, et al. "An Ultracompact GRIN-Lens-Based Spot Size Converter using Subwavelength Grating Metamaterials," Laser Photonics Rev., vol. 13, 7 pages (2019).
Nalimov, et al., "Three-dimensional simulation of a device to input light in a planar waveguide," 11th International Conference on Laser and Fiber-Optical Networks Modeling (LFNM), pp. 1-2 (2011).
Raguin, et al., "Antireflection structured surfaces for the infrared spectral region," Applied Optics, vol. 32, No. 7, pp. 1154-1167 (1993).
Rytov, "Electromagnetic Properties of a Finely Stratified Medium," Soviet Physics JEPT, vol. 2, pp. 466-475 (1956).
Tong, et al., "Efficient Mode Multiplexer for Few-Mode Fibres Using Integrated Silicon-on-Insulator Waveguide Grating Coupler," IEEE J. Quant. Elect., vol. 56, No. 1, 3 pages(2020).
Triandaphilov, et al., "Photonic Crystal Mikaelian Lens," Optical Memory and Neural Networks (Information Optics), vol. 17, No. 1. pp. 1-7 (2008).
Wang, et al., "Self-Focusing and the Talbot Effect in Conformal Transformation Optics," Phys. Rev. Lett., vol. 119, 5 pages (Jul. 18, 2017).
Wu, et al., "Mode-Division Multiplexing for Silicon Photonic Network-on-chip," Journal of Lightwave Technology, 6 pages (Mar. 2017).
Yang, et al., "Compact Mikaelian Lens Synthesized by Metasurfaces," IEEE Antennas and Wireless Propagation Letters, vol. 17, No. 3, pp. 397-400 (Mar. 2018).
Zhang, et al., "Ultracompact 40-Channel Arrayed Waveguide Grating on Silicon Nitride Platform at 860 nm," IEEE J. Quant. Elect, vol. 56, No. 1, article 8400308, doi: 10.1109/JQE.2019.2951034, 8 pages (2020).
Zhou, et al., "Subwavelength Engineering in Silicon Photonics Devices," IEEE J. Selected Topics in Quantum Electronics, vol. 25, No. 3, 13 pages (2019).

U.S. Appl. No. 16/844,137, filed Apr. 9, 2019, 47 pages.
Chen, et al., "Nanoholes Grating Couplers for Coupling Between Silicon-on-Insulator Waveguides and Optical Fibers," IEEE Photonics Journal, vol. 1, No. 3, pp. 184-190 (Sep. 2009).
Chen, et al., "Two dimensional silicon waveguide chirped grating couplers for vertical optical fibers," Optics Communications, vol. 283, Issue 10, pp. 2146-2149 (May 2010).
Dai, et al., "Silicon mode (de)multiplexer enabling high capacity photonic networks-on-chip with a single-wavelength-carrier light," Opt. Lett., vol. 38, No. 9, pp. 1422-1424 (2013).
Dai, et al., "10-Channel Mode (de)multiplexer with Dual Polarizations," Laser & Photonics Reviews, vol. 12., 9 pages (2017).
Ding, et al., "On-chip Mode Multiplexer Based on a Single Grating Coupler," IEEE Photonics Conference, pp. 707-708 (2012).
Ding, et al., "Silicon Photonic Integrated Circuit Mode Multiplexer," IEEE Photonics Technology Letters, vol. 25, No. 7, pp. 648-651 (2013).
Ding, et al., "Efficient silicon PIC mode multiplexer using grating coupler array with aluminum mirror for few-mode fiber," 2015 Conference on Lasers and Electro-Optics (CLEO), pp. 1-2. (2015).
Fontaine, et al., "Space-division multiplexing and all-optical MIMO demultiplexing using a photonic integrated circuit," OFC/NFOEC, Los Angeles, CA, pp. 1-3 (2012).
Koonen, et al., "Silicon Photonic Integrated Mode Multiplexer and Demultiplexer," IEEE Photonics Technology Letters, vol. 24, No. 21, pp. 1961-1964 (Nov. 2012).
Ryf, et al., "Mode-Division Multiplexing Over 96 km of Few-Mode Fiber Using Coherent 6 x 6 MIMO Processing," Journal of Lightwave Technology, vol. 30, No. 4, pp. 521-531 (Feb. 15, 2012).
Wohlfeil, et al., "A Two-Dimensional Fiber Grating Coupler on SOI for Mode Division Multiplexing," IEEE Photonics Technology Letters, vol. 28, No. 11, pp. 1241-1244, 1 (Jun. 2016).
Wu, et la., "3 x 104 Gb/s Single-λ Interconnect of Mode-Division Multiplexed Network With a Multicore Fiber," Journal of Lightwave Technology, vol. 36, No. 2, pp. 318-324 (2018).

* cited by examiner

INTEGRATED LENS MODE SIZE CONVERTER

BACKGROUND OF THE INVENTION

This application relates to semiconductor and dielectric photonic devices, and without limitation to a mode-size converter. Optical communication uses light to convey information. Data centers and communication across the Internet rely heavily on optical-fiber communication. Optical communication systems implement many different optical elements. One optical element used in some systems is a taper in a semiconductor or planar dielectric waveguide. A taper can be used to adiabatically expand light from a narrower portion of the waveguide to a wider portion of a waveguide (e.g., as described in US Publication No. 2009/0290837, published on Nov. 26, 2009). With the rapid growth of data traffic, there exists a need for improved optical communication systems and methods.

BRIEF SUMMARY OF THE INVENTION

An adiabatic taper can be used as a mode size converter. However, an adiabatic taper can be relatively long. In some embodiments, a lens having an index profile of a Mikaelian lens is used to efficiently expand light. The index profile is made in a waveguide using subwavelength structures based on the effective medium theory. A mode size converter having a length of 12 μm can have comparable first-order mode transmission of an adiabatic taper 600 μm in length, which can greatly reduce a size of a few mode waveguide grating coupler.

In some embodiments, a beam expander for optical communication multiplexing comprises: a channel waveguide characterized by a first width of a material, wherein the material is a core of the channel waveguide, and/or the first width is equal to or less than 2 microns; an output coupler characterized by a second width of the material, wherein the second width is equal to or greater than 12 microns and equal to or less than 50 microns; and/or a lens. The lens comprises a plurality of ridges, wherein: the lens is between the channel waveguide and the output coupler; the plurality of ridges are formed of the material; the plurality of ridges are oriented transverse to a direction of beam propagation of light in the channel waveguide, so that light from the channel waveguide is configured to pass through the plurality of ridges; the lens is configured to expand light from the channel waveguide to the output coupler, without spherical aberration, such that light from a first-order transverse mode of the channel waveguide is coupled into a first-order transverse mode of the output coupler; the plurality of ridges are spaced apart from each other by a distance less than a wavelength of light that is configured to be guided by channel waveguide, divided by twice a refractive index of the material; the lens is characterized by a length, the length extending from the channel waveguide to the output coupler in the direction of beam propagation of the channel waveguide; the length of the lens is equal to or less than 25 microns; the plurality of ridges are defined by a duty cycle, wherein the duty cycle is a ratio of a length of a first ridge compared to a center-to-center distance between the first ridge and a second ridge adjacent to the first ridge; and/or the duty cycle varies laterally so that the output coupler is configured to have a refractive index profile approximated by the equation:

$$n(x) = \frac{n_0}{\cosh(\beta x)}$$

where: n(x) is a refractive index of the lens; x is in a direction lateral to the direction of beam propagation; $n_0$ is the refractive index of the material; and/or β is a constant. In some embodiments, the material is single-crystal silicon and/or the beam expander further comprises a transition region characterized by ridges of the plurality of ridges superimposed over a taper, wherein widths of ridges increase while a width of the taper decreases in a direction of the channel waveguide toward the output coupler.

In some embodiments, a system comprises: a first channel waveguide characterized by a first width of a material, wherein the material is a core of the first channel waveguide; a second channel waveguide characterized by a second width of the material, wherein the second width is greater than the first width; and/or a lens comprising a plurality of ridges formed of the material, wherein: the plurality of ridges are oriented so that light from the first channel waveguide is configured to pass through the plurality of ridges; and/or the lens is configured to expand light from a first-order transverse mode of the first channel waveguide into a first-order transverse mode of the second channel waveguide, without spherical aberration. In some embodiments, an output coupler is formed in the second channel waveguide; the first width is equal to or less than 1.5 microns and the second width is equal to or greater than 14 microns; the lens has a length extending from the first channel waveguide to the second channel waveguide, and the length is equal to or less than 200 microns; the lens has a refractive index profile approximated by the equation:

$$n(x) = \frac{n_0}{\cosh(\beta x)};$$

the material is a single-crystal semiconductor; the system is part of a spatial multiplexer configured to output light from orthogonal waveguides using an output coupler; the plurality of ridges have a varying duty cycle as a function of a dimension transverse to a direction of beam propagation; adjacent ridges of the plurality of ridges are separated by distances of no more than three-quarters of wavelength of light configured to propagate through the plurality of ridges; the plurality of ridges comprises 5 or more ridges and 50 or less ridges; and/or a ridge of the plurality of ridges is a continuous portion of material, and material between ridges of the plurality of ridges is removed so that there is no material of a ridge between the plurality of ridges.

In some embodiments, a method for expanding a transverse optical mode comprises: transmitting light in a first channel waveguide toward a lens, wherein: the first channel waveguide is characterized by a first width of a material, and the material is a core of the first channel waveguide; expanding light transmitted from the first channel waveguide by transmitting light through a plurality of ridges of the lens, wherein the lens is configured to expand light from a first-order transverse mode of the first channel waveguide into a first-order transverse mode of a second channel waveguide, without spherical aberration; and/or out coupling light from the second channel waveguide using an output coupler, after expanding light by transmitting light through the plurality of ridges of the lens. In some embodiments, light transmitted from the first channel waveguide includes light propagating in a fundamental transverse mode and light propagating in the first-order transverse mode; the plurality of ridges have a varying duty cycle as a function of a dimension transverse to a direction of beam propagation; the lens has a refractive index profile approximated by the equation: n(x)=

$$\frac{n_0}{\cosh(\beta x)};$$

the lens has a length extending from the first channel waveguide to the second channel waveguide, and the length is equal to or less than 50 microns; and/or transmission of the first-order transverse mode from the first channel waveguide propagating through the lens is greater than 90%.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
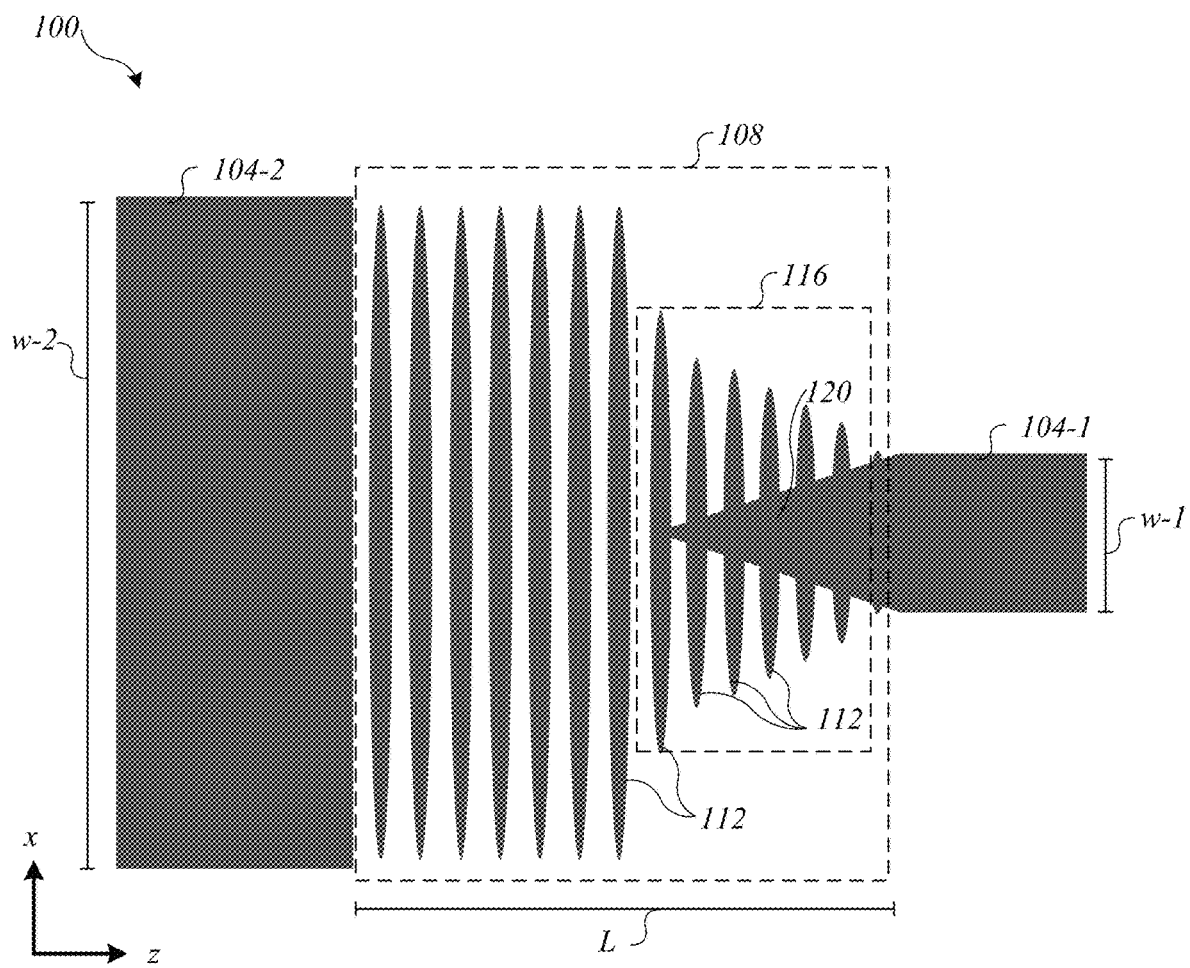
FIG. 1. A simplified diagram of an embodiment of a mode expander coupling two waveguides.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

I. Introduction

In recent years, multimode waveguide grating couplers for an interface between multimode optical fibers and planar lightwave circuits have been developed for high capacity mode division multiplexing communications (Y. Tong, et al., "Efficient Mode Multiplexer for Few-Mode Fibers Using Integrated Silicon-on-Insulator Waveguide Grating Coupler," IEEE J. Quantum Electron, vol. 56, no. 1, pp. 1-7, 2020). In few-mode grating couplers, linear, adiabatic tapers were used between a wide waveguide grating coupler and a multimode waveguide in order to reduce transition loss from a wide width of the fiber coupler region to a narrower width of the multimode waveguide in the planar lightwave circuit. Long lengths for the waveguide taper were used to keep transition losses low. For example, a taper length of 600 μm was used by Y. Tong.

Subwavelength gratings are periodic structures that have pitches shorter than the wavelength of light being used, and subwavelength gratings can be used to engineer an effective refractive index of a material by adjusting a duty cycle and/or pitch of the subwavelength grating. A compact, subwavelength grating structure can be used as an optical lens. A graded refractive index (GRIN) lens structure is known to focus light (e.g., J. Luque-González et al., "An Ultracompact GRIN-Lens-Based Spot Size Converter using Subwavelength Grating Metamaterials," LASER PHOTONICS REV, vol. 13, pp. 1900172, 2019). The GRIN lens has a parabolic refractive index profile. Though a GRIN lens can be used to expand an optical beam transmitted in a fundamental transverse mode of a waveguide, the GRIN lens does not expand higher order modes as efficiently as the fundamental mode because spherical aberrations of the GRIN lens reduce transmittance of off-axis light.

A Mikaelian lens, having a refractive index profile given by Equation 1 below, can be used to focus light with little to no spherical aberration (X. Wang, et al., "Self-Focusing and the Talbot Effect in Conformal Transformation Optics," Phys. Rev. Lett, vol. 119, no. 3, pp. 033902, 2017).

$$n(x) = \frac{n_0}{\cosh(x)} \qquad \text{Equation 1}$$

A Mikaelian profile lens has been used for microwave (J. W. Yang et al "Compact Mikaelian Lens Synthesized by Metasurfaces" IEEE Antennas and Wireless Propagation Letters, vol. 17, pp. 397-400 2018) and optical frequencies (AG. Nalimov et al, "Three-dimensional simulation of a device to input light in a planar waveguide," 11th International Conference on Laser & Fiber-Optical Networks Modeling, 5-8 September, Kharkov, Ukraine, 2011). In 2011, a Mikaelian lens formed by a photonic crystal metamaterial region was proposed for use with a single mode waveguide grating coupler (Id.). The Mikaelian lens formed by a photonic crystal metamaterial by AG. Nalimov was not applied for the use in multimode waveguide grating couplers.

The low spherical aberration of the Mikaelian lens makes it suitable for focusing off-optical-axis light propagating in higher order modes. In some embodiments, a subwavelength grating lens with an effective refractive index given by Equation 1 (e.g., a Mikaelian lens) is used as a mode-size converter for multimode light in a waveguide. For example, a Mikaelian lens can be used in a waveguide to focus light from a 20 μm wide multimode grating coupler to a 1 μm wide multimode waveguide in a short focusing length, which can replace a long adiabatic taper, resulting in a smaller footprint for a multimode grating coupler.

3D FDTD simulation results show that an embodiment of a 12 μm long, subwavelength mode-size converter has comparable first-order mode transmission as a 600 μm adiabatic taper, reducing a transition region by a factor of 50.

II. Sample Approach

Referring first to FIG. 1, a simplified diagram of an embodiment of a beam expander 100 is shown. The beam expander 100 comprises a first waveguide 104-1, a second waveguide 104-2, and a lens 108 coupling the first waveguide 104-1 with the second waveguide 104-2. The lens 108 can be referred to as a mode expander.

The waveguides 104 are channel waveguides. A channel waveguide confines light in two dimensions. The waveguides 104 confine light in the x and y dimensions. The waveguides 104 are formed of a material having a refractive index n0. In some embodiments, the material is a semiconductor material, such as silicon, III-V compound, or II-VI compound. The material can be a single-crystal structure. For example, the material can from a device layer of a silicon-on-insulator (SOI) wafer, wherein a buried oxide layer is used to confine light in a negative y direction and air or other cladding material (e.g., an oxide) disposed on top of the device layer is used to confine light in the positive y direction. The device layer can be etched or ion implanted to define a width w of the waveguide 104. The width w of the waveguide 104 is used to confine light in the x direction. The material is the core of the waveguide 104.

The first waveguide 104-1 is characterized by a first width w-1. The second waveguide 104-2 is characterized by a second width w-2. The second width w-2 is wider than the first width w-1. The lens 108 is disposed between the first waveguide 104-1 and the second waveguide 104-2. The lens 108 is configured to expand light propagating from the first waveguide 104-1 to the second waveguide 104-2 and/or constrict light propagating from the second waveguide 104-2 to the first waveguide 104-1.

The lens 108 comprises a plurality of ridges 112. The ridges 112 are made of the same material as the waveguides 104. The plurality of ridges 112 are oriented transverse to a direction of beam propagation of light in first waveguide 104-1, so that light from the first waveguide 104-1 is configured to pass through the plurality of ridges 112. For example, light is configured to propagate in the −z direction (or +z direction) and the ridges 112 are elongated in the x direction. The ridges 112 are elongated so that a width of a ridge 112, measured in the x direction, is greater than (e.g., equal to or greater than 2, 3, 5, 10, or 15 times) a length of a ridge 112, measured in the z direction.

The lens 108 is configured to expand light from the first waveguide 104-1 to the second waveguide 104-2 without spherical aberration, such that light from a first-order transverse mode of the first waveguide 104-1 is coupled into a first-order transverse mode of the second waveguide 104-2. To expand light from the first waveguide 104-1 to the second waveguide 104-2, without spherical aberration, the lens 108 is configured to have a refractive index profile according to Equation 1.

The plurality of ridges 112 form a subwavelength grating, wherein the center to center distances between adjacent ridges (period length) is less than a wavelength of light, which is configured to be guided by the channel waveguide, divided by twice the refractive index of the material, e.g., period length $\leq \lambda/(2n_0)$. In some embodiments, adjacent ridges of the plurality of ridges 112 are separated by distances of no more than three-quarters of wavelength of light configured to propagate through the plurality of ridges 112.

The lens 108 is characterized by a length L. The length L extends from the first waveguide 104-1 to the second waveguide 104-2, in a direction of beam propagation of the channel waveguide (e.g., length L is measured in the z direction). In some embodiments, the length L is equal to or less than 200, 100, 75, 50, or 25 microns.

The lens 108 comprises a transition region 116. The transition region 116 comprises a taper 120. The transition region is characterized by ridges 112 superimposed over the taper 120, wherein widths of ridges 112 of the transition region 116 increase in width while a width of the taper 120 decreases in a direction of the first waveguide 104-1 toward the second waveguide 104-2 (e.g., in the −z direction). In some embodiments, the taper 120 is used to reduce index mismatch between the first waveguide 104-1 and the lens 108.

Figure 2:
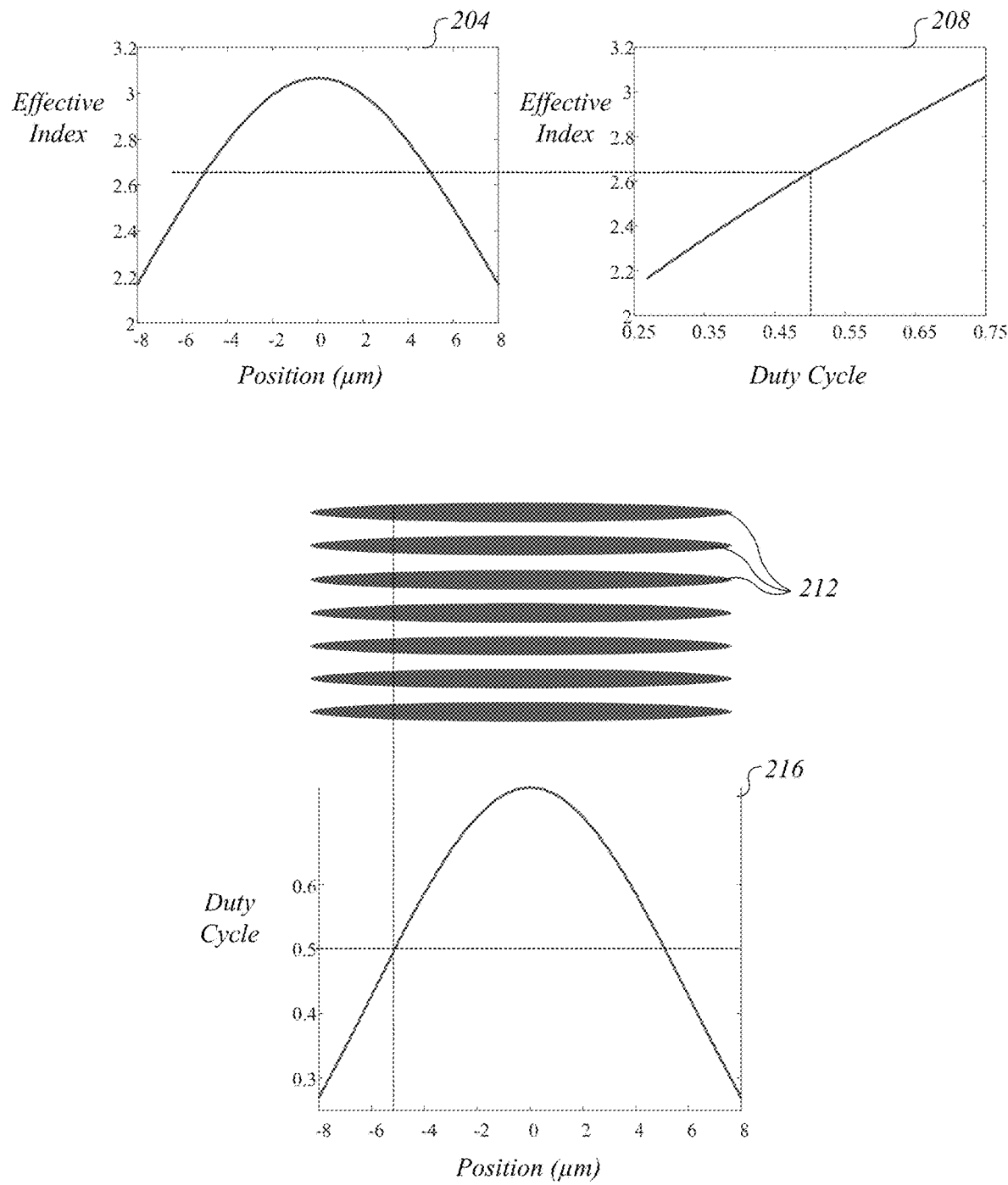
FIG. 2. Charts showing how to create a Mikaelian lens in a semiconductor waveguide.

FIG. 2. In FIG. 2, charts are used to demonstrate how to create a lens 108 in a waveguide having a refractive index profile approximated by Equation 1. FIG. 2 comprises a first graph 204, a second graph 208, a plurality of ridges 212, and a third graph 216. The plurality of ridges 212 are similar to the ridges 112 in FIG. 1.

The first graph 204 is a chart of effective index (i.e., refractive index) of an embodiment of the lens 108 in FIG. 1 as a function of lateral position (in the x direction) of the lens 108. The effective index is the cumulative refractive index of the ridges 112 and trenches (spacing between the ridges 112) light will encounter after having passed through the length L of the lens 108 in FIG. 1. The first graph 204 depicts a desired index profile of a lens, in some embodiments.

The effective index in the first graph 204 is given by the equation:

$$n(x) = \frac{n_0}{\cosh(\beta x)} \qquad \text{Equation 2}$$

where:
 n(x) is the effective index of the lens;
 x is in a direction lateral to a direction of beam propagation;
 $n_0$ is a refractive index of the material; and
 β is a constant.

Though the first graph 204 shows an example of a desired index profile, the question then turns to how to design a grating that approximates the desired index profile. The second graph 208 is a chart of effective index as a function of duty cycle of a subwavelength grating. Duty cycle is a ratio between a length of a ridge and a period of the grating (e.g., measured in the z direction in FIG. 1). The second graph 208 shows that as duty cycle increases (e.g., as a length of a ridge as measured in the z direction is increased compared to a length of a trench measured in the z direction), effective index increases because a higher percentage of the material is used. Dotted lines on the first graph 204 and the second graph 208 show that for a particular value of effective index, a particular duty cycle can be chosen.

The second graph 208 is based on Equation 3 and Equation 4 below:

$$n_{TE}^{(2)} = n_{TE}^{(0)} \left[ 1 + \frac{\pi^2}{3} \left(\frac{\Lambda}{\lambda}\right)^2 f^2 (1-f)^2 \times (n_{ridge}^2 - n_{trench}^2)^2 (n_{TM}^{(0)})^2 \left(\frac{(n_{TE}^{(0)})^2}{n_{ridge}^2 n_{trench}^2}\right)^2 \right]^{1/2} \quad \text{Equation 3}$$

$$n_{TM}^{(2)} = n_{TM}^{(0)} \left[ 1 + \frac{\pi^2}{3} \left(\frac{\Lambda}{\lambda}\right)^2 f^2 (1-f)^2 \times (n_{ridge}^2 - n_{trench}^2)^2 \frac{1}{(n_{TM}^{(0)})^2} \right]^{1/2} \quad \text{Equation 4}$$

where:

$$n_{TM}^{(0)} = [f \times n_{trench}^2 + (1-f) \times n_{ridge}^2]^{1/2}$$

$$\frac{1}{n_{TE}^{(0)}} = \left[\frac{f}{n_{trench}^2} + \frac{(1-f)}{n_{ridge}^2}\right]^{1/2}$$

and where $n_{TM}^{(0)}$ and $n_{TE}^{(0)}$ are refractive indexes of the TM mode and TE mode derived by the zeroth-order approximation. $n_{ridge}$ and $n_{trench}$ are refractive index of the ridge and the trench. $\lambda$ is the center wavelength. $\Lambda$ is the grating period and f is the filling factor defined by the proportion of the trench length with respect to the grating period.

Equations 3 and 4 are based on the effective medium theory (e.g., as described in Daniel H. Raguin and G. Michael Morris, "Antireflection structured surfaces for the infrared spectral region," Applied Optics, Vol. 32, No. 7, 1993). In some configurations, a pitch of the subwavelength grating is fixed and the duty cycle is varied to engineer a refractive index profile at different positions along the x axis. The second order effective medium approximation is used to calculate how the effective index varies with duty cycle as shown in the second graph 208.

The third graph 216 shows a one-to-one, position-to-duty-cycle mapping to obtain how the duty cycle varies to produce a desired effective index profile. The duty cycle of the grating formed by the ridges 212 is thus adjusted so that the grating has a refractive index approximated by Equation 2. In some embodiments, approximated means within an error of plus or minus one, two, five, ten, or fifteen percent. The ridges 212 are thicker at a center and thinner at an edge so that there is a higher effective index at the center of the lens and a lower effective index at the edge (e.g., as shown in the first graph 204).

Figure 3:
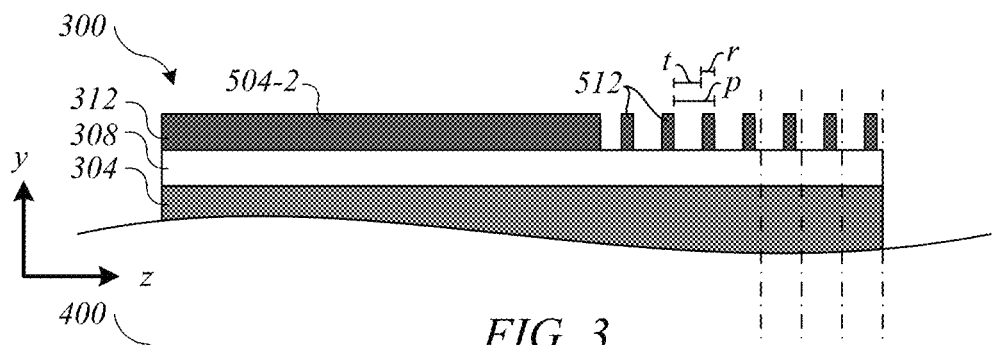
FIG. 3. Cross section of an embodiment of a mode expander showing duty cycle as a function of position.
Figure 4:
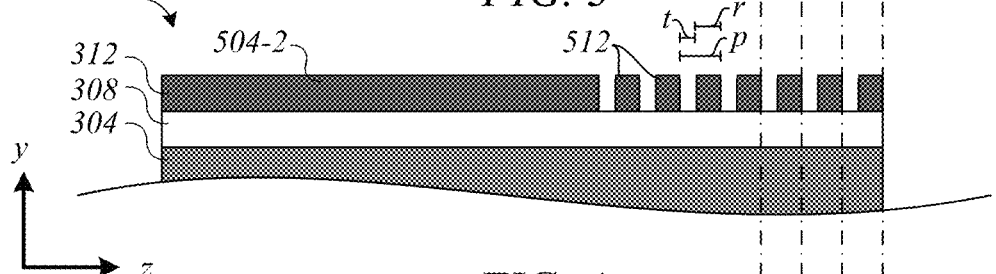
FIG. 4. Another cross sections of the embodiment of the mode expander showing duty cycle as a function of position.
Figure 5:
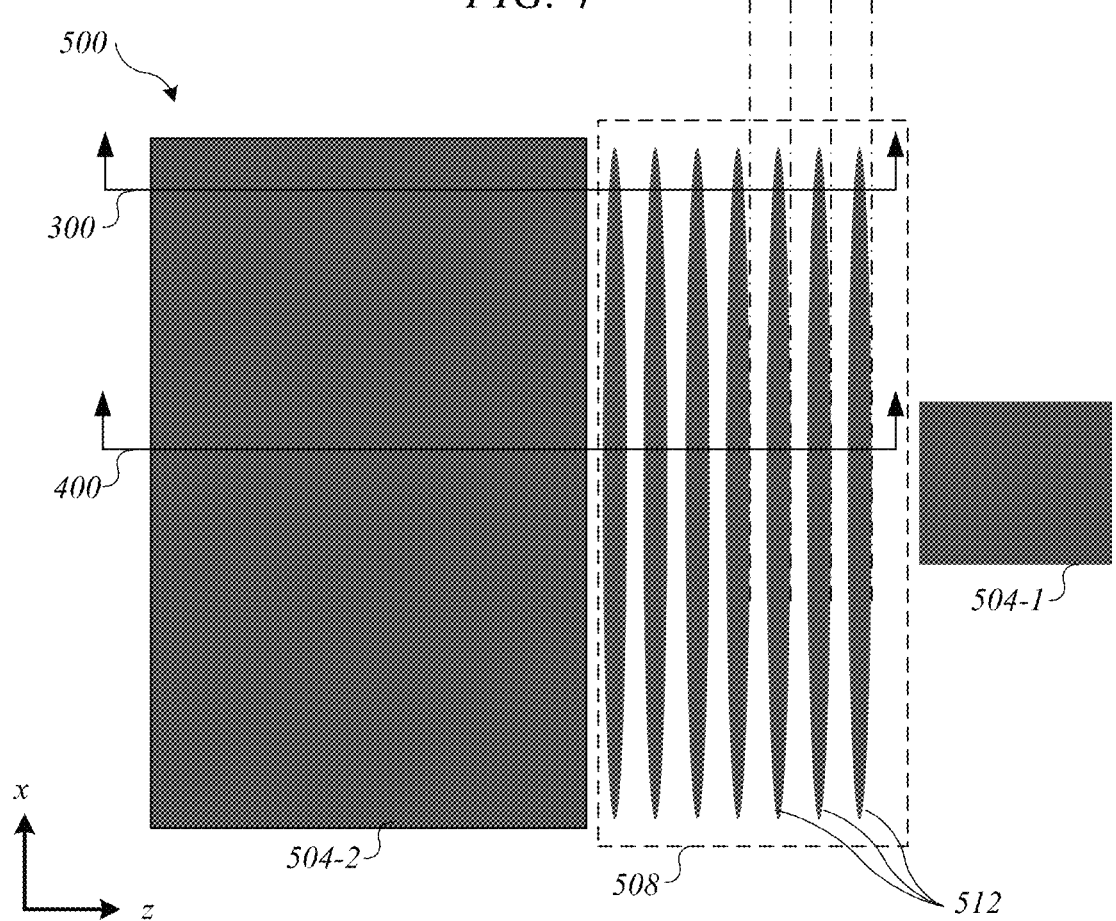
FIG. 5. A top view of the embodiment of the mode expander in FIGS. 3 and 4.

FIGS. 3, 4, and 5 are used to show variation of duty cycle. FIG. 3 depicts a first cross section 300 of an embodiment of a mode expander. FIG. 4 depicts a second cross section 400 of the mode expander. FIG. 5 is a top view of the mode expander 500 shown in FIGS. 3 and 4. FIGS. 3, 4, and 5 are not to scale with charts in FIG. 2, but are exaggerated in some parts to show how the mode expander 500 is designed.

The mode expander 500 comprises a first waveguide 504-1, a second waveguide 504-2, and a lens 508 coupling the first waveguide 504-1 with the second waveguide 504-2. The first waveguide 504-1 is similar to the first waveguide 104-1 in FIG. 1, and the second waveguide 504-2 is similar to the second waveguide 104-2 in FIG. 1. The lens 508 comprises ridges 512, which are similar to ridges 112 in FIG. 1 and/or to ridges 212 in FIG. 2. The lens 508 has a duty cycle that varies a function of position (e.g., duty cycle varies in the x dimension).

FIG. 3 shows the first cross section 300 characterized by a first duty cycle. The first cross section 300 is closer to an edge than the second cross section 400. The first cross section 300 includes a substrate 304, an insulating layer 308, and a device layer 312. The ridges 512, the second waveguide 504-2, and the first waveguide 504-1 are formed of the material of the device layer 312. The insulating layer 308 has a lower refractive index than the device layer 312 (e.g., to confine light in the −y direction). In some embodiments, the device layer 312 is a single-crystal layer of an SOI wafer, the insulating layer 308 is a buried oxide layer ("BOX") of the SOI wafer, and the substrate 304 is a handle portion of the SOI wafer.

Trenches are etched in the device layer 312 to form the ridges 512 of the lens 508. A period is a distance from one ridge 512 to an adjacent ridge 512 and characterized by a length p. A trench is characterized by a length t, and the ridge 512 is characterized by a length r. Lengths are measured along the z dimension. The length p is equal to the sum of the length r and the length t. Duty cycle is a ratio of the length r of the ridge 512 with respect to the length p of the period (e.g., duty cycle=r/p).

The plurality of ridges 512 have a varying duty cycle as a function x (e.g., a dimension transverse to a direction of beam propagation). In FIG. 4, a second cross section 400 of the mode expander 500 is shown. The length p of the period of the second cross section 400 is equal to the length p of the period of the first cross section 300. However, the length r of the ridge 512 of the second cross section 400 is greater than the length r of the ridge 512 of the first cross section 300, so that the duty cycle of the second cross section 400 is greater than the duty cycle of the first cross section 300. The duty cycle of the lens 508 is configured to vary laterally (e.g., in the x direction) so that the lens 108 is configured to have a refractive index profile approximated by Equation 2.

Though ridges 512 are separated by trenches, the ridges 512 are made from the same single-crystal layer as each other and of the waveguides 504 (e.g., from the device layer 312). In FIGS. 3-5, a ridge 512 is a continuous portion of material, and material between ridges is removed so that there is no material of a ridge 512 (e.g., no material of the device layer 312) between ridges 512. In some embodiments, there is no material of a ridge 512 of a height of the ridge 512 between ridges 512. The ridges 512 have a smooth continuous shape. Though a ridge 512 is shown in FIGS. 3-5 as a continuous piece of material, and a trench between ridges 512 is shown as one continuous void, other configurations are possible. For example, a trench could be formed by a plurality of circular holes made to approximate an outline of a trench; and/or a ridge could have breaks (e.g., holes formed in the ridge 512 to further reduce an effective index of the lens 508). In some embodiments, a ridge 512 is a continuous and/or smooth structure for applying the effective medium theory more smoothly.

III. Results

Figure 6:
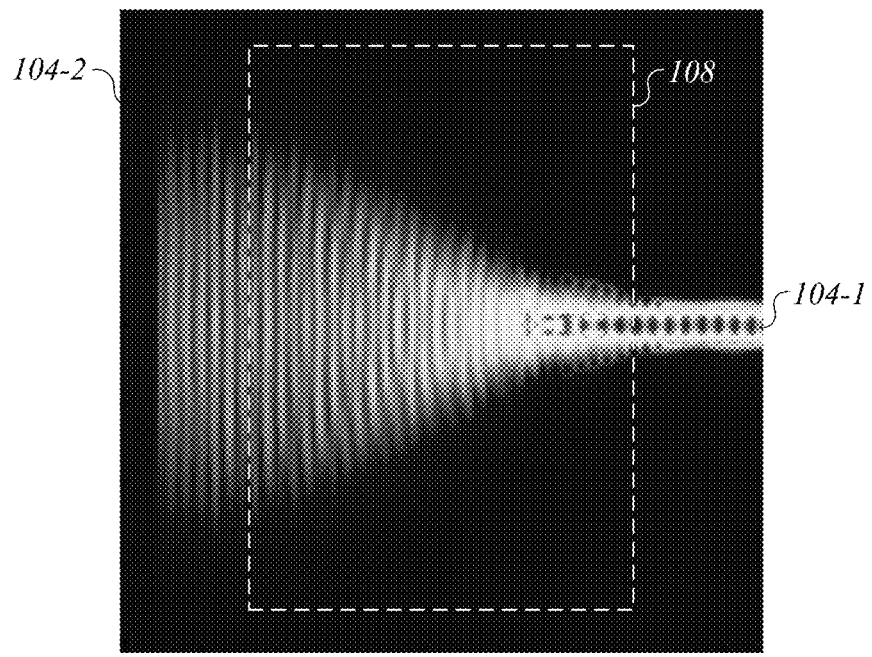
FIG. 6. A simulation of light propagation in an embodiment of a mode expander.

FIG. 6. In FIG. 6, a simulation of optical field distribution of light propagation in a fundamental mode of a beam expander is shown. 3D FDTD simulations were used to simulate the propagation of light in the fundamental mode from the second waveguide 104-2, through the lens 108, and to the first waveguide 104-1.

Figure 7:
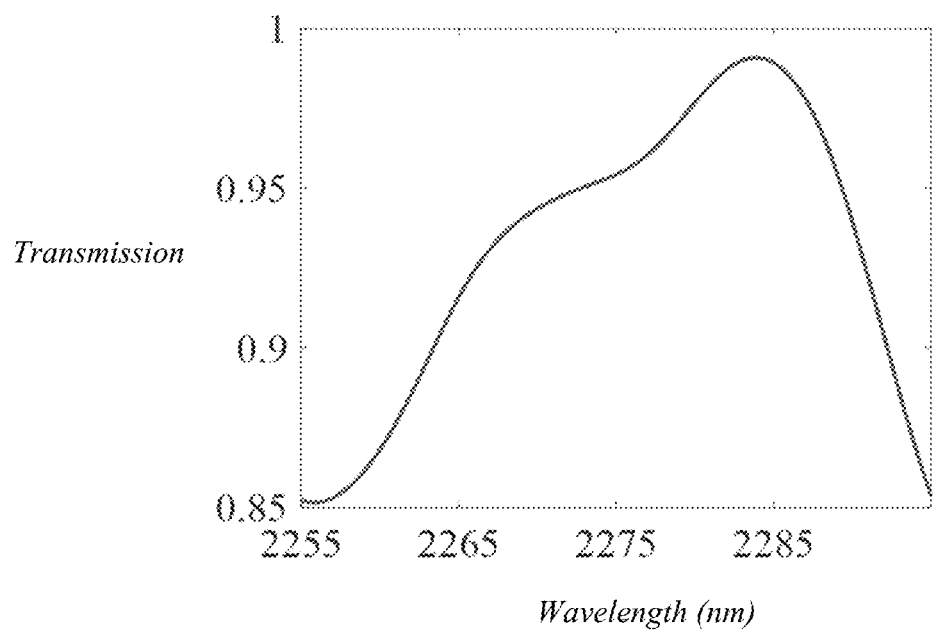
FIG. 7. A graph of transmission of a fundamental mode in the mode expander of FIG. 6.

FIG. 7. FIG. 7 is a graph of transmission of the fundamental mode of the beam expander in FIG. 6 as a function of wavelength. Transmission of the fundamental mode is equal to or greater than 85, 90, 95, or 97%, depending on wavelength. Transmission can be optimized based on the wavelength of light used.

Figure 8:
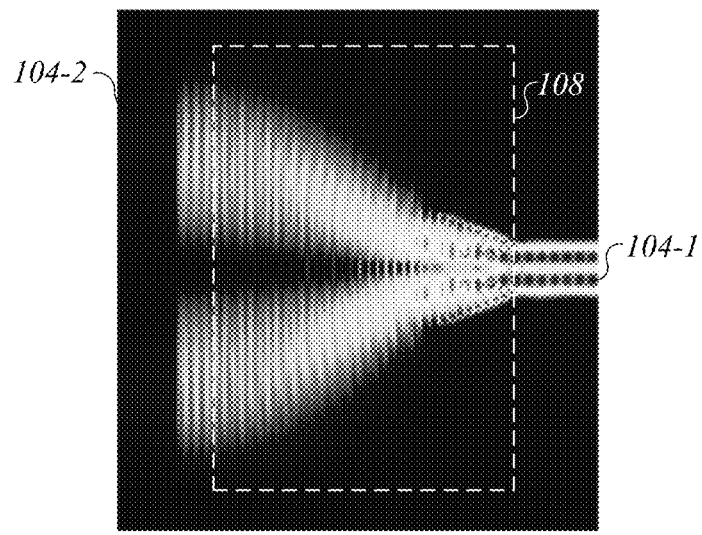
FIG. 8. A simulation of light propagation in the embodiment of the mode expander of FIG. 6.

FIG. 8. In FIG. 8, a simulation of optical field distribution of light propagation in a first-order mode of a beam expander is shown. 3D FDTD simulations were used to simulate the propagation of light in the first-order mode from the second waveguide 104-2, through the lens 108, and to the first waveguide 104-1.

Figure 9:
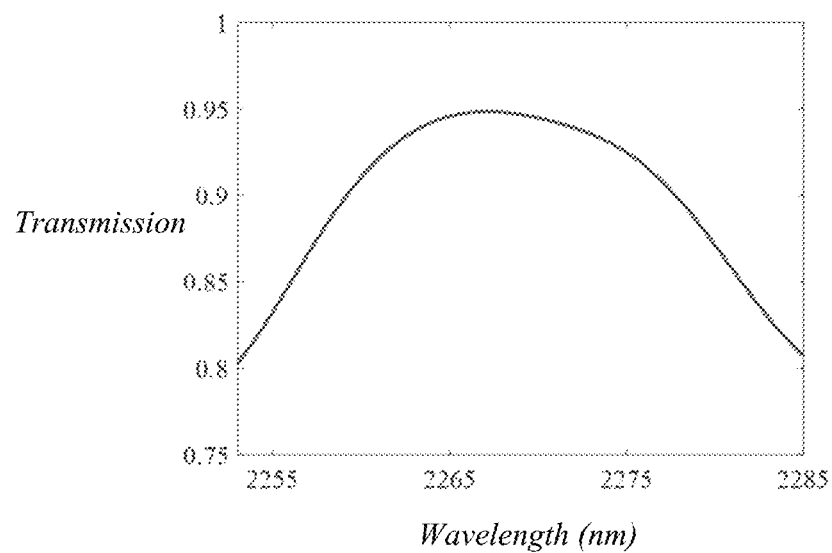
FIG. 9. A graph of transmission of a first-order mode in the mode expander of FIG. 8.

FIG. 9. FIG. 9 is a graph of transmission of the first-order mode of the beam expander in FIG. 8 as a function of wavelength. Transmission of the first-order mode is equal to or greater than 80, 85, 90, 93, or 95%, depending on wavelength. Transmission can be optimized based on the wavelength of light used. Thus up to at least 95% transmission of the first-order mode can be realized.

Figure 10:
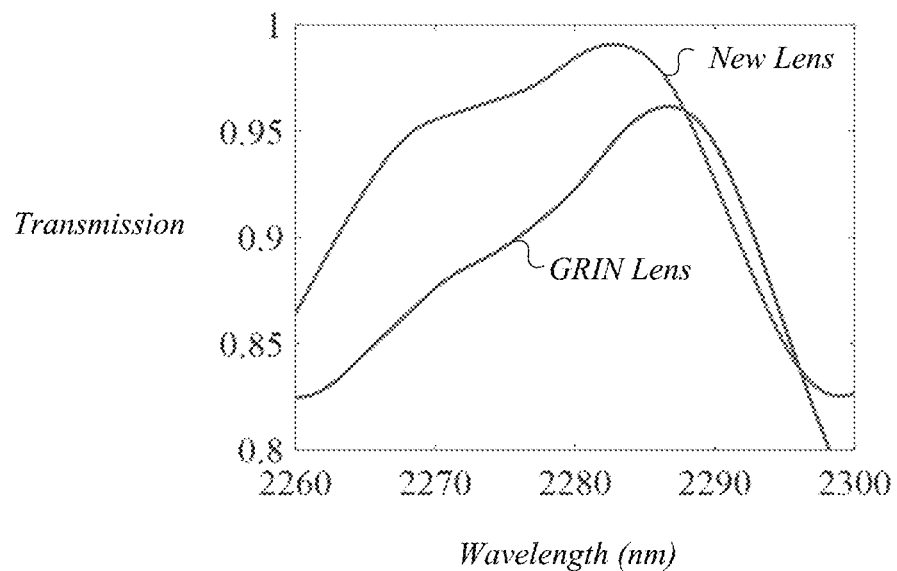
FIG. 10. A graph comparing transmission of a fundamental mode in the mode expander to transmission of a fundamental mode in a GRIN lens.

FIG. 10. A graph comparing transmission of the fundamental mode of a "new lens" (e.g., a semiconductor lens made to approximate the refractive index profile of Equation 2) to transmission of a fundamental mode using a GRIN lens is shown. The new lens has higher transmission than the GRIN lens for transmitting light in the fundamental mode.

Figure 11:
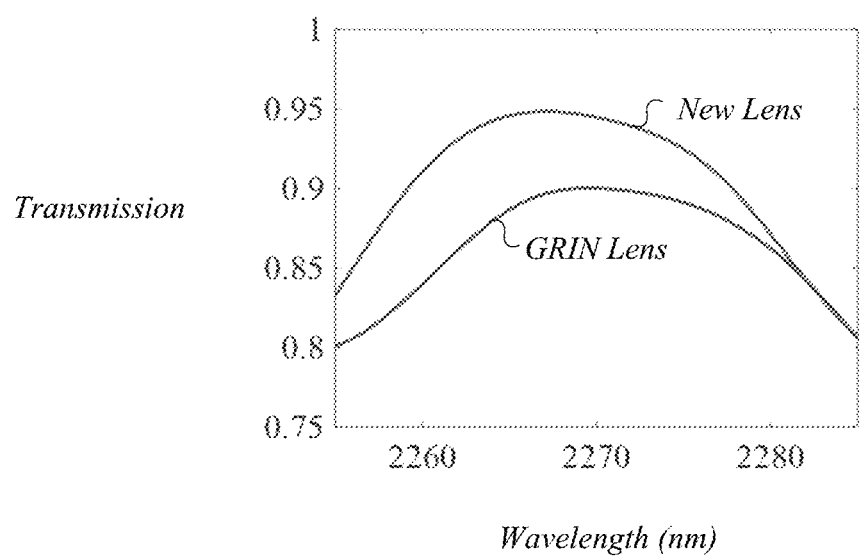
FIG. 11. A graph comparing transmission of a first-order mode in the mode expander to transmission of a first-order mode in a GRIN lens.

FIG. 11. A graph comparing transmission of the first-order mode of the new lens to transmission of a first-order mode using a GRIN lens is shown. The new lens has higher transmission than the GRIN lens for transmitting the first-order mode. Note that the new lens has a transmission of the first-order mode of greater than 90%, whereas the GRIN lens does not. The GRIN lens is not as efficient at transmitting the first-order mode because the GRIN lens has higher spherical aberration for off-axis light.

IV. Fabricated Device

Figure 12:
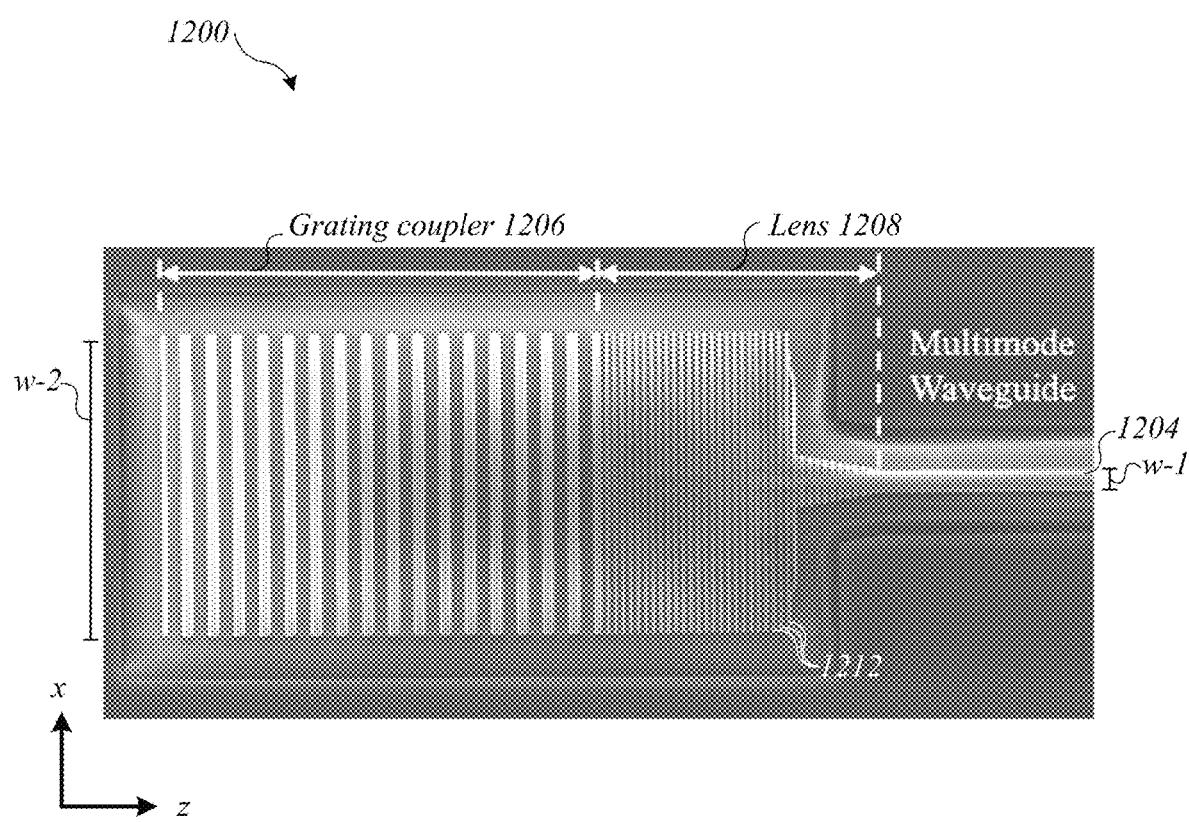
FIG. 12. An image of an embodiment of a mode expander.

FIG. 12. An image of an embodiment of a beam expander 1200 is shown. The beam expander 1200 comprises a waveguide 1204, a grating coupler 1206, and a lens 1208. The waveguide 1204 is similar to the first waveguide 104-1 in FIG. 1. The grating coupler 1206 can be considered a channel waveguide since the grating coupler 1206 confines light in both the x direction and in the −y direction. Put another way, the grating coupler 1206 is formed in the second waveguide 104-2 of FIG. 1. The grating coupler 1206 is configured to couple light out of a waveguide orthogonal to a direction of beam propagation in the waveguide 1204. For example, light propagates in the −z direction in the waveguide 1204 and the grating coupler 1206 directs light received from the lens 1208 to propagate "out of the page," in the y direction.

The waveguide 1204 is characterized by the first width w−1, and the grating coupler 1206 is characterized by the second width w−2. The lens 1208 comprises a plurality of ridges 1212. The ridges 1212 are similar to the plurality of ridges 112 in FIG. 1. The lens 1208 has a refractive index that varies in the x direction according Equation 2.

In some embodiments, the first width w−1 is equal to or less than 5, 3, 2, 1.5, or 1 microns. The waveguide 1204 is a multimode waveguide and can have a first width, w−1, greater than a wavelength of light and up to three, five, or ten times the wavelength of light configured to be guided by the waveguide 1204.

In some embodiments, the grating coupler 1206 is used as an output coupler of a multiplexer. For example, the grating coupler 1206 could be used as an output coupler for a spatial multiplexer as described in U.S. patent application Ser. No. 16/844,137, filed on Apr. 9, 2020 (e.g., the grating coupler 1206 in the instant description can be used for the output coupler 108 in FIG. 1 of the '137 application), which is incorporated by reference. In some embodiments, the beam expander 1200 is part of a spatial multiplexer configured to output light from orthogonal waveguides using an output coupler. Accordingly, the second width w−2 is equal to or greater than 12 or 15 microns and/or equal to or less than 19, 30, 50, or 100 microns, in some embodiments.

In the '137 application, adiabatic tapers (e.g., tapers 120 in FIG. 1 of the '137 application) are used to expand light. In some embodiments, tapers of the '137 application are replaced with the lens 1208 of the instant description. For example, the first taper 120-1, the second taper 120-2, or both the first taper 120-1 and the second taper 120-2 of FIG. 1 in the '137 application are replaced by the lens 1208 in FIG. 12 or by the lens 108 in FIG. 1 in the instant description. The tapers of the '137 application can have a length on the order of 300 to 600 μm, whereas a length of the lens 1208 (e.g., length L in FIG. 1) in the instant description can have a length equal to or less than 200, 100, 50, 30, 25, or 20 microns and/or equal to or greater than 2, 5, or 10 microns (e.g., depending on wavelength of light used and/or widths of waveguides 104 being coupled).

Though the lens 1208 in FIG. 12 has 37 ridges 1212, more or less ridges 1212 could be used. In some embodiments, the plurality of ridges 1212 comprises 5 or more ridges 1212 and 100, 75, 50, 30 or less ridges 1212.

V. Example Processes

Figure 13:
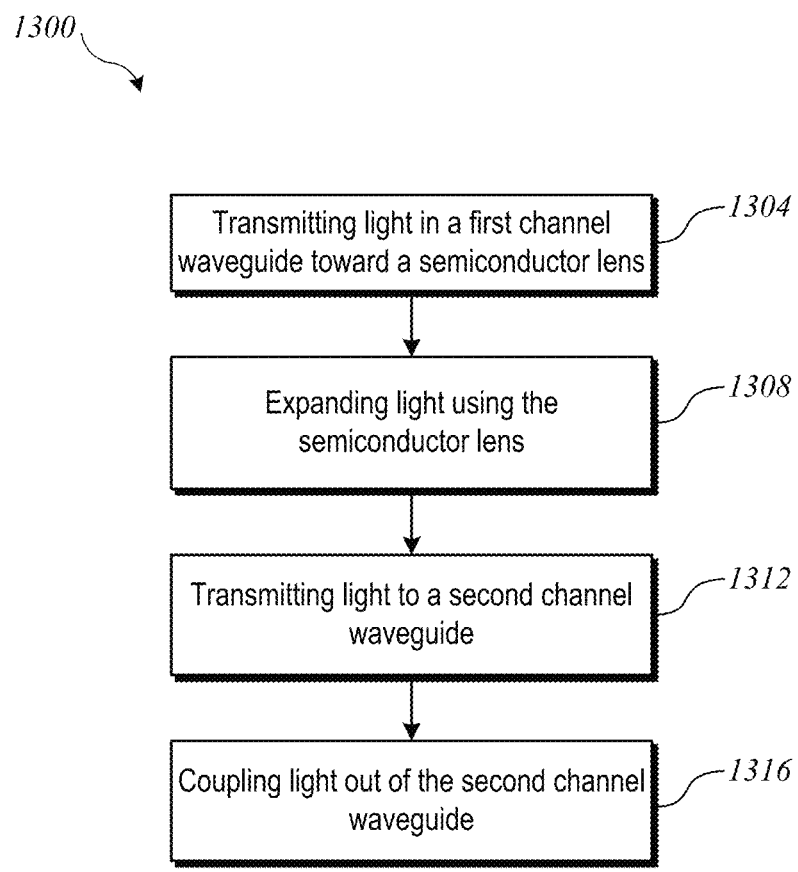
FIG. 13. A flowchart of an embodiment of a method for expanding an optical beam using a mode expander.

FIG. 13. A flowchart of an embodiment of a process 1300 for expanding an optical beam using a mode expander is shown. Process 1300 begins in step 1304 with transmitting light in a first channel waveguide toward a semiconductor lens. For example, the first channel waveguide can be the first waveguide 104-1 in FIG. 1 or the waveguide 1204 in FIG. 12; the semiconductor lens can be the lens 108 in FIG. 1 or the lens 1208 in FIG. 12. Accordingly, the first channel waveguide is characterized by a first width (e.g., width w−1) of a material (e.g., single-crystal silicon), wherein the material is a core of the first channel waveguide.

In step 1308, light is expanded using the semiconductor lens. The semiconductor lens comprises a plurality of ridges (e.g., ridges 112 in FIG. 1 or ridges 112 in FIG. 12). Light is transmitted through the plurality of ridges of the semiconductor lens. The plurality of ridges can have a varying duty cycle as a function of a dimension transverse (e.g., x direction) to a direction of beam propagation (e.g., −z direction). In some embodiments, the first-order mode is transmitted through the lens with a transmission greater than 90% (e.g., see FIG. 9).

In step 1312, light is transmitted from the semiconductor lens into a second channel waveguide (e.g., the second waveguide 104-2 in FIG. 1 or the grating coupler 1206 in FIG. 12). The semiconductor lens is configured to expand light from a first-order transverse mode of the first channel waveguide into a first-order transverse mode of the second channel waveguide, without spherical aberration. For example, the semiconductor lens has an index profile approximated by Equation 2. FIG. 8 shows coupling of the first-order mode of the first waveguide 104-1 into the first-order mode of the second waveguide 104-2.

In step 1316, light is coupled out of the second channel waveguide, after light is expanded. For example, the grating coupler 1206 in FIG. 12 couples light out of the waveguide and into the y direction, after light is expanded through the lens 1208. In some embodiments, step 1316 is omitted.

Figure 14:
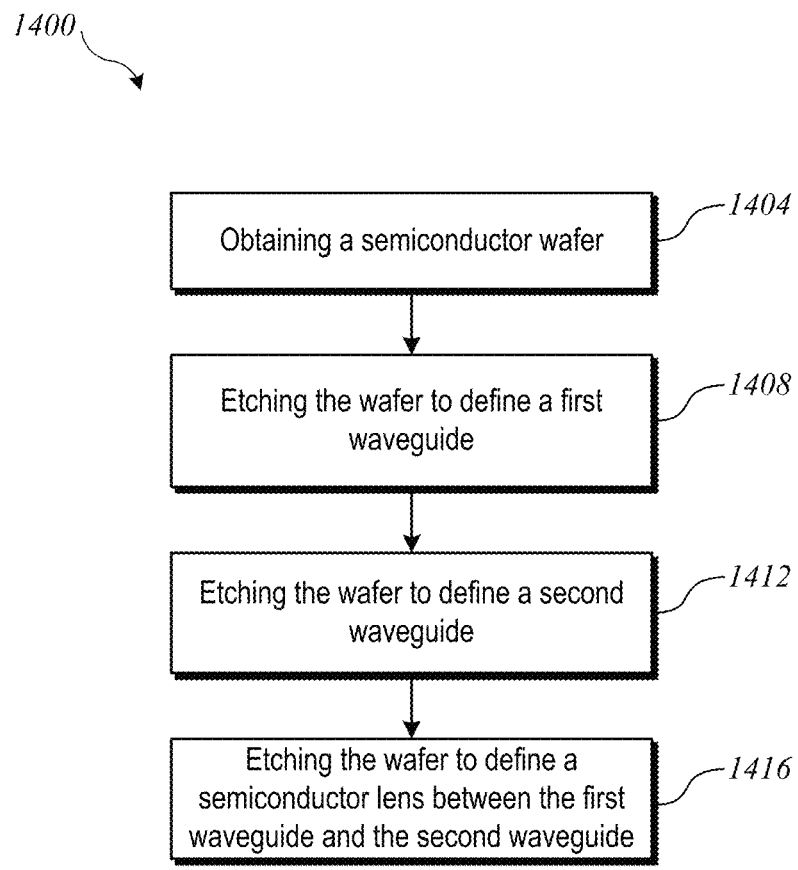
FIG. 14. A flowchart of an embodiment of a method for fabricating a mode expander.

FIG. 14. A flowchart of an embodiment of a process 1400 for fabricating a mode expander is shown. Process 1400 begins in step 1404 with obtaining a semiconductor wafer. In some embodiments, the semiconductor wafer is an SOI wafer having a device layer, a handle portion, and a buried oxide layer between the device layer and the handle portion. In step 1408, the semiconductor wafer is etched to define a first waveguide. For example, the semiconductor wafer is etched to form the first waveguide 104-1 in FIG. 1 by etching material in the x direction that exceeds the first width w−1. In step 1412, the semiconductor wafer is etched to define a second waveguide. For example, the semiconductor wafer is etched to form the second waveguide 104-2 in FIG. 1 by etching material in the x direction that exceeds the second width w−2. In step 1416, the semiconductor wafer is etched to define a semiconductor lens between the first waveguide and the second waveguide. For example, trenches are etched in the device layer to form ridges 112 of FIG. 1. In some embodiments, steps 1408, 1412, and 1416 are performed concurrently (e.g., using a single mask for etching). In some embodiments, the semiconductor lens is constructed to have a duty cycle that varies as a function of width so that the semiconductor lens has a refractive index profile approximated by Equation 2.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an," or "the" is intended to mean "one or more" unless specifically indicated to the contrary. The use of "first", "second", "third", etc. are used to differentiate similar features and not necessarily meant to imply a sequential order.

What is claimed is:

1. A beam expander for optical communication multiplexing, the beam expander comprising:
   a channel waveguide characterized by a first width of a material, wherein:
      the material is a core of the channel waveguide, and
      the first width is equal to or less than 2 microns;
   an output coupler characterized by a second width of the material, wherein the second width is equal to or greater than 12 microns and equal to or less than 50 microns; and
   a lens comprising a plurality of ridges, wherein:
      the lens is between the channel waveguide and the output coupler;
      the plurality of ridges are formed of the material;
      the plurality of ridges are oriented transverse to a direction of beam propagation of light in the channel waveguide, so that light from the channel waveguide is configured to pass through the plurality of ridges;
      the lens is configured to expand light from the channel waveguide to the output coupler, without spherical aberration, such that light from a first-order transverse mode of the channel waveguide is coupled into a first-order transverse mode of the output coupler;
      the plurality of ridges are spaced apart from each other by a distance less than a wavelength of light that is configured to be guided by channel waveguide, divided by twice a refractive index of the material;
      the lens is characterized by a length, the length extending from the channel waveguide to the output coupler in the direction of beam propagation of the channel waveguide;
      the length of the lens is equal to or less than 25 microns;
      the plurality of ridges are defined by a duty cycle, wherein the duty cycle is a ratio of a length of a first ridge compared to a center-to-center distance between the first ridge and a second ridge adjacent to the first ridge; and
      the duty cycle varies laterally so that the output coupler is configured to have a refractive index profile approximated by the equation:

$$n(x) = \frac{n_0}{\cosh(\beta x)}$$

where: n(x) is a refractive index of the lens;
      x is in a direction lateral to the direction of beam propagation;
      $n_0$ is the refractive index of the material; and
      β is a constant.

2. The beam expander of claim 1, wherein the material is single-crystal silicon.

3. The beam expander of claim 1, further comprising a transition region characterized by ridges of the plurality of ridges superimposed over a taper, wherein widths of ridges increase while a width of the taper decreases in a direction of the channel waveguide toward the output coupler.

4. A system comprising:
   a first channel waveguide characterized by a first width of a material, wherein the material is a core of the first channel waveguide;
   a second channel waveguide characterized by a second width of the material, wherein the second width is greater than the first width; and
   a lens comprising a plurality of ridges formed of the material, wherein:
      the plurality of ridges are oriented so that light from the first channel waveguide is configured to pass through the plurality of ridges; and
      the lens is configured to expand light from a first-order transverse mode of the first channel waveguide into a first-order transverse mode of the second channel waveguide, without spherical aberration.

5. The system of claim 4, wherein an output coupler is formed in the second channel waveguide.

6. The system of claim 4, wherein the first width is equal to or less than 1.5 microns and the second width is equal to or greater than 14 microns.

7. The system of claim 4, wherein:
the lens has a length extending from the first channel waveguide to the second channel waveguide, and
the length is equal to or less than 200 microns.

8. The system of claim 4, wherein the lens has a refractive index profile approximated by the equation:

$$n(x) = \frac{n_0}{\cosh(\beta x)}$$

where: n(x) is a refractive index of the lens;
x is in a direction lateral to a direction of beam propagation;
$n_0$ is a refractive index of the material; and
β is a constant.

9. The system of claim 4, wherein the material is a single-crystal semiconductor.

10. The system of claim 4, wherein the system is part of a spatial multiplexer configured to output light from orthogonal waveguides using an output coupler.

11. The system of claim 4, wherein the plurality of ridges have a varying duty cycle as a function of a dimension transverse to a direction of beam propagation.

12. The system of claim 4, wherein adjacent ridges of the plurality of ridges are separated by distances of no more than three-quarters of wavelength of light configured to propagate through the plurality of ridges.

13. The system of claim 4, wherein the plurality of ridges comprises 5 or more ridges and 50 or less ridges.

14. The system of claim 4, wherein a ridge of the plurality of ridges is a continuous portion of material, and material between ridges of the plurality of ridges is removed so that there is no material of a ridge between the plurality of ridges.

15. A method for expanding a transverse optical mode, the method comprising:
transmitting light in a first channel waveguide toward a lens, wherein:
the first channel waveguide is characterized by a first width of a material, and
the material is a core of the first channel waveguide;
expanding light transmitted from the first channel waveguide by transmitting light through a plurality of ridges of the lens, wherein the lens is configured to expand light from a first-order transverse mode of the first channel waveguide into a first-order transverse mode of a second channel waveguide, without spherical aberration; and
out coupling light from the second channel waveguide using an output coupler, after expanding light by transmitting light through the plurality of ridges of the lens.

16. The method of claim 15, wherein light transmitted from the first channel waveguide includes light propagating in a fundamental transverse mode and light propagating in the first-order transverse mode.

17. The method of claim 15, wherein the plurality of ridges have a varying duty cycle as a function of a dimension transverse to a direction of beam propagation.

18. The method of claim 15, wherein the lens has a refractive index profile approximated by the equation:

$$n(x) = \frac{n_0}{\cosh(\beta x)}$$

where: n(x) is a refractive index of the lens;
x is in a direction lateral to a direction of beam propagation;
$n_0$ is a refractive index of the material; and
β is a constant.

19. The method of claim 15, wherein:
the lens has a length extending from the first channel waveguide to the second channel waveguide, and
the length is equal to or less than 50 microns.

20. The method of claim 15, wherein transmission of the first-order transverse mode from the first channel waveguide propagating through the lens is greater than 90%.

* * * * *